May 14, 1946.  R. M. ECKERMAN ET AL  2,400,401
PERISCOPIC VISION DEVICES
Filed April 22, 1943  2 Sheets-Sheet 2

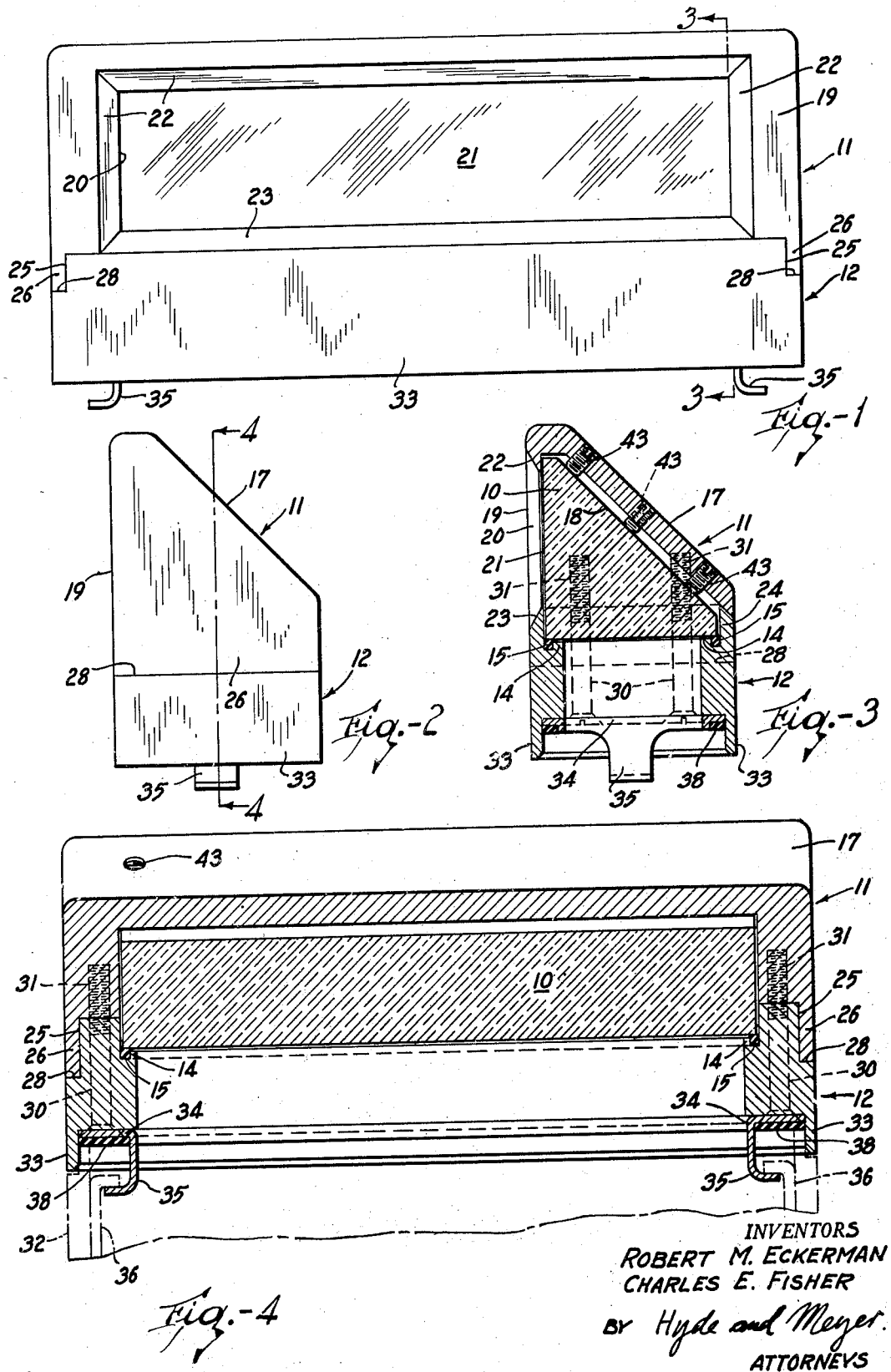

INVENTORS
ROBERT M. ECKERMAN
CHARLES E. FISHER
BY Hyde and Meyer.
ATTORNEYS.

Patented May 14, 1946

2,400,401

UNITED STATES PATENT OFFICE 2,400,401

PERISCOPIC VISION DEVICE

Robert M. Eckerman and Charles E. Fisher, Detroit, Mich., assignors to The Standard Products Company, Detroit, Mich., a corporation of Ohio Application April 22, 1943, Serial No. 484,024

1 Claim. (Cl. 88—1)

This invention relates to improvements in periscopic vision devices, such as are used in armored tanks, airplanes, armored gun emplacements and in other locations where it is necessary or desirable to keep the observer out of direct, unprotected alignment with enemy weapons. More particularly, the present invention relates to that type of periscopic vision device in which one or both of its end structures, each containing one or more reflecting surfaces for affording to an observer indirect vision of an object, are mounted for rapid and convenient assembly and disassembly, so that a damaged end structure can be readily replaced.

The present invention has for its primary object the provision of an improved end structure for a periscopic vision device of the aforesaid character, said end structure containing a simple and inexpensive prism having a particularly efficient light-reflecting face, strong and sturdy housing means for such prism, conveniently manipulable means for optically locating such prism within said housing means, and especially effective and durable means for maintaining the prism in such optical location.

Further objects of the present invention, such as the achievement of structural simplicity, economy of manufacture, ease of assembly of parts, etc., will be referred to in, or will be evident from, the following description of one embodiment of the invention, reference being had to the accompanying drawings, in which Fig. 1 is a front elevational view of the upper end structure of a periscopic vision device of the aforesaid type, said end structure embodying one form of the present invention;

Fig. 2 is an end elevational view of said end structure, the view being representative of each end thereof;

Fig. 3 is a vertical transverse sectional view of said end structure, the view being on the line 3—3 of Fig. 1;

Fig. 4 is a vertical longitudinal sectional view of said end structure, the view being on the line 4—4 of Fig. 2;

Figure 5:
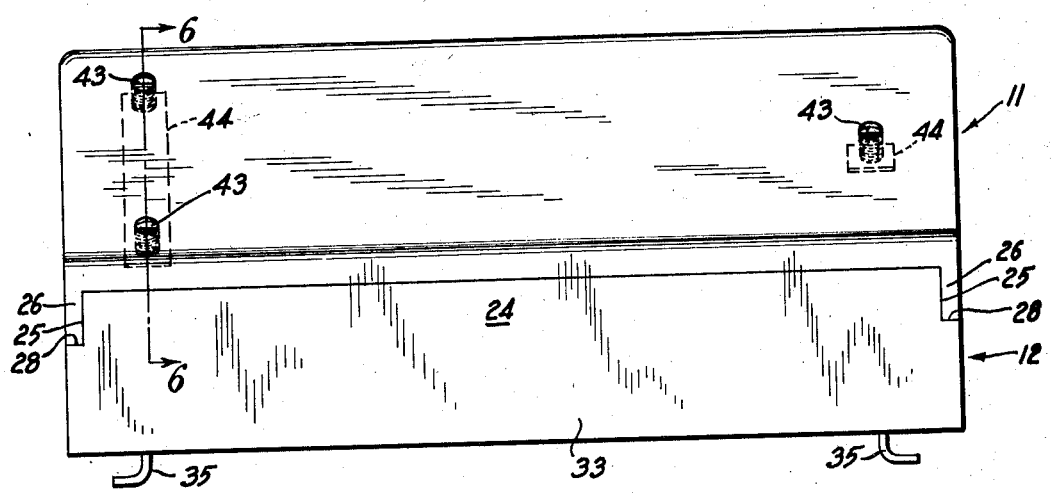
Fig. 5 is a rear elevational view of said end structure.
Figure 6:
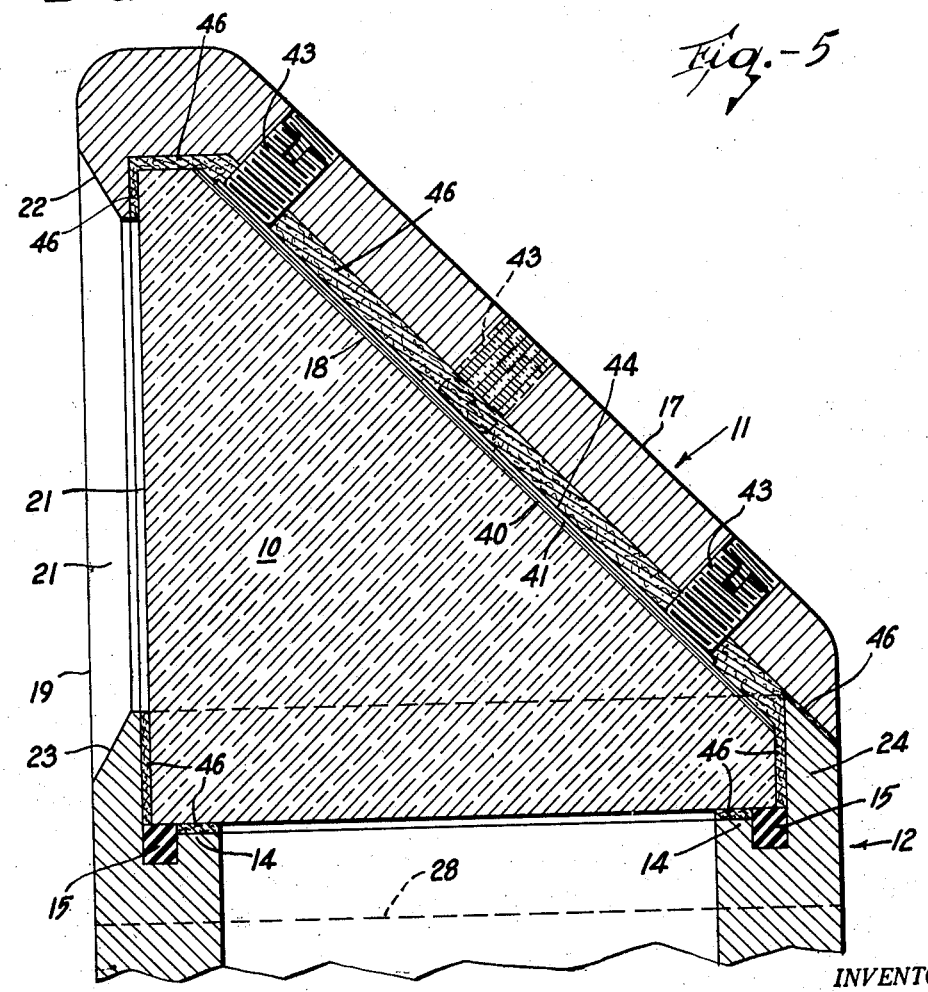
Fig. 6 is an enlarged fragmentary sectional view on the line 6—6 of Fig. 5.

Before the invention here involved is specifically described, it is to be understood that the present invention is not limited to the details of construction and/or the specific arrangement of parts herein illustrated and/or described, as the invention obviously may take other forms. It also is to be understood that the phraseology or terminology herein employed is for the purpose of description and not of limitation, the scope of the present invention being indicated by the appended claim.

As heretofore mentioned, the invention here involved has particular relation to periscopic vision devices for use in armored tanks, airplanes, armored gun emplacements and the like. Periscopic devices of this type usually comprise a body structure (in which may be mounted, if desired, a telescope or the like), and upper and lower end structures detachably connected to said body structure so that their replacement can be rapidly and conveniently effected. Each such end structure contains one or more reflecting surfaces for angularly diverting rays of light from an object under observation through one or more successive changes in direction before said light rays reach the eye of the observer, it being thus possible to protect such observer from enemy fire. Although either or both of such end structures may embody the invention here involved, as will hereinafter be evident, the present invention is here embodied only in the upper end structure of a periscopic device of the type or character heretofore referred to.

As will be evident from the accompanying drawings, the upper end structure here illustrated, for detachable connection to the body structure of a periscopic vision device of the aforesaid type, includes a single prism 10 and a two-part housing therefor, the upper housing part of the cap member being designated by the reference numeral 11 and the lower housing part or base member being designated by the reference numeral 12.

The prism 10 is of the right-angled form commonly used in optical devices, the two light-transmitting faces of the prism and the single internally light-reflecting face thereof being optically flat or practically so. Although a glass prism is here shown and in many respects is preferred, a plastic prism may be used, such as a prism of transparent methyl methacrylate, for example.

The two housing members 11 and 12 may be made of any suitable material, such as metal or one of the thermosetting plastic materials, such as a phenolic plastic, the use of a plastic material enabling the housing members to be rapidly and economically molded, as will be readily understood.

As best shown in Figs. 3 and 4, the housing base member 12 is of hollow form and of generally rectangular shape, the opening through said member being of corresponding rectangular shape, as will be evident from a comparison of Figs. 3 and 4. On the inner surface of each of its four walls and below its top surface, this housing base member 12 is provided with a shoulder or ledge 14 for the support of the prism 10, the shoulder or ledge of each wall merging with the shoulders or ledges of adjacent walls, as here shown. A continuous gasket 15 of yieldable character is here utilized as a seat for the prism 10, said gasket being mounted in grooves with which the shoulders or ledges 14 are provided and preferably being of such thickness as to project slightly above said shoulders or ledges. The prism 10 is thus confined to its seat on the gasket 15 by the top portions of the four walls of the housing base member 12, said wall portions extending an appreciable distance above the shoulders or ledges 14 and closely surrounding the lower end portion of the prism, as shown in Figs. 3 and 4.

The housing cap member 11 is of generally hooded form, with a cavity or chamber of such size and shape as to more or less snugly receive the major portion of the prism 10 which projects above the housing base member 12, the top wall 17 of the housing cap member having an inclination generally corresponding to that of the rear light-reflecting face 18 of the prism 10. In its front wall 19, the housing cap member 11 is provided with a generally rectangular opening 20, which extends through the bottom edge of said front wall and is of such size as to expose substantially the entire front face 21 of the prism 10 for light-transmitting purposes. If desired and as here shown, those portions of the front wall 19 of the housing cap member 11, which lie along the sides and along the top of the opening 20, may be of inwardly beveled form, as at 22, there being a corresponding beveling of the part 23 of the top edge portion of the housing base member 12 which lies along the bottom of said opening.

When the two housing members 11 and 12 are assembled, the bottom surfaces of the two end walls and the bottom surfaces of the end portions of the front wall 19, of the housing cap member 11 overlie and are supported by the top surfaces of the corresponding walls or wall portions of the housing base member 12. In addition, the lower surface of the rear edge portion of the inclined top wall 17 of the housing cap member 11 overlies and is supported by the correspondingly inclined top surface of the rear wall 24 of the housing base member 12, all as clearly shown in the accompanying drawings. In order to enable such assembly to be of telescoping character, at least in part, the end walls of one of the housing members are externally recessed to receive projecting flanges of the end walls of the other housing member. As here shown, the end walls of the housing base member 12 are provided with recesses 25 which receive depending flanges 26 of the end walls of the housing cap member 11, the length of said recesses and flanges being coextensive with the depth of the housing end walls, and the dependency of said flanges being such that they are supported by the shoulders 28 provided by the formation of said recesses 25, in the embodiment of the invention as here shown. To maintain the two housing members in assembly, a pair of screws 30 extend upwardly through suitable apertures in each end wall of the housing base member 12 and are threaded or otherwise secured in suitable sockets 31 in the end walls of the housing cap member 11.

In Fig. 4 is indicated in dotted lines the upper end portion of the tubular body structure 32 of the periscopic vision device to which the present end structure is connected in use thereof. As shown, the bottom surfaces of the four walls of the housing base member 12 of said end structure overlie the top surfaces of the four walls of said body structure, there being a telescoping relationship of these structures which is here provided by inwardly offsetting the upper end portions of the walls of said body structure and by forming the walls of the housing base member 12 of the end structure with depending flanges 33 which closely surround the inwardly offset wall portions of said body structure.

To enable the present end structure to be easily and quickly attached to and detached from the body structure 32, so that replacement of said end structure, if it is damaged, can be readily and quickly effected, a centrally apertured sheet metal latch plate 34 is here secured to the bottom surfaces of the walls of the housing base member 12, said plate having latching means for cooperation with latching means of said body structure in effecting such attachment and detachment. If desired and as here shown, the securement of the latch plate 34 to the bottom surfaces of the walls of the housing base member 12 is effected by the use of the screws 30 which connect the two housing members 11 and 12, there being counter-sunk apertures in said plate, in the present embodiment of the invention, to receive the heads of said screws. Extending from each end of said plate is a depending L-shaped latching finger 35, and such fingers cooperate with shiftable latching fingers 36 on the end walls of the body structure 32 in effecting the detachable connection of the present end structure to said body structure, all in a manner which will be readily understood.

Preferably, a yieldable gasket 38 is interposed between the body structure 32 of the periscopic vision device and the upper end structure therefor, said gasket being held to its seat against the latch plate 34 by the latching fingers 35 of said plate and by the depending flanges 33 of the walls of the housing base member 12.

In order to enable the inclined rear face 18 of the prism 10 to more efficiently reflect in a downward direction the light rays entering the prism through its vertically disposed front face 21, a metallic coating 40 of high reflectivity preferably, and here is, applied to the prism face 18. The application of said coating may be effected by any suitable method, such as by the well known vaporization and condensation method, it being desirable, if such a coating is used, to cover it with a protective layer 41 of lacquer or the like.

It is, of course, necessary to orientate the prism 10 with respect to the reflecting surface or surfaces which cooperate therewith in affording an observer the indirect and protected view for which these periscopic devices were designed. For such adjustment of the prism 10 within its two-part housing, a plurality of adjusting screws 43 are mounted in the inclined top wall 17 of the housing cap member 11 for cooperation with the inclined light-transmitting face 18 of said prism. As here shown, there are three such adjusting screws, two spaced along one end edge of said inclined top wall 17 and one adjacent the other end edge of said top wall and substantially midway between the front and rear edges of such wall. To avoid the necessity of having these adjusting screws directly contact the protective layer 41 on the prism face 18, with consequent liability of damage to the metallic reflecting coating 40, small patches 44 of cardboard, thin metal or the like may be interposed between said screws and the prism face 18 for contact by said screws, the application of the patches 44 to the layer 41 of lacquer or the like preferably being effected while such layer is in a tacky condition so that said patches will adhere thereto.

To permanently maintain the prism 10 in its properly adjusted position within the housing members 11 and 12, use is here made of a mastic or similar temporarily yieldable but age hardenable material. Preferably, this mastic material while in a plastic state, is applied to all contiguous and opposed surfaces (housing to housing surfaces, housing to prism surfaces and gasket to housing or prism surfaces), and the space between the inclined prism face 18 and the inclined top wall 17 of the housing cap member 11 also is preferably filled with such material, all to the end of effectively maintaining the prism 10 in proper position, after such position has been determined.

Prior to assembling the present improved end structure, therefore, those surfaces of the two housing members and those surfaces of the prism, which are in contiguous and opposed relationship in the assembled structure, are coated with plastic mastic material 46. The prism 10 is now seated on gasket 15, and the housing cap member 11 is positioned over the exposed portion of the prism and moved to its position of rest upon the housing base member 12. The latch plate 34 is next positioned in contact with the bottom surfaces of the walls of said housing base member and the screws 30 inserted and drawn up sufficiently to hold the two housing members in assembled relationship.

While the mastic material is still yieldable, the now assembled end structure is placed on a jig on an optical bench and by manipulation of the adjusting screws 43, the position of the prism 10 within its housing is properly determined, use being made of a testing ray of incident light entering the prism and reflected by its inclined face 18 to a calibrated position on a target or the like, or until some other adequate optical test indicates that the position of the prism is accurately collimated. The assembly-maintaining screws 30 are now drawn up to final position, and the mastic material permitted to harden or set, with consequent fixation of the prism position, the hardening or setting step being expedited by heat treatment, if desired.

As heretofore pointed out, the space between the light-reflecting prism face 18 and the inclined housing wall 17 preferably is filled with mastic material, and such material may be supplied to said space either before or after the optical position of the prism is determined. If supplied before, the material in this space hardens or sets with the rest of the mastic material. If supplied later, the other mastic material is permitted to harden or set and the plastic mastic material for this space is introduced, by injection, through one of the apertures for the adjusting screws 43. If desired, all of the adjusting screws 43 may be withdrawn after the prism 10 is "fixed" in position, and the screw apertures filled with mastic material which thereafter hardens or sets.

From the foregoing description thereof, it is evident that the present improved end structure is characterized by its simplicity, its economy of manufacture and its efficiency.

To those skilled in the art to which the present invention relates, further features and advantages of end structures embodying the present invention will be evident from the foregoing description of one such embodiment.

What we claim is:

The method of attaching a collimatable optical prism in a housing comprising hollow base and cap members, a wall of the cap member being provided with a plurality of perforations having a respective plurality of movable adjusting means seated therein, said method consisting of applying temporarily yieldable but age hardenable mastic material to inner surfaces of the base and cap members, disposing said prism within said housing and between said base and cap members in such manner that said mastic material is compressed between adjoining surfaces of said prism and said base and cap members, and so that a wall surface of said prism is in contact with operating surfaces of said adjusting means, collimating said prism with respect to the optical axis of said housing by movement of said prism by means of said adjusting means while the said mastic material is yieldable, permitting said mastic material to harden while said adjusting means is maintained in position, removing said adjusting means from said apertures, filling the space vacated by said removal with additional temporarily yieldable but age hardenable mastic material, and permitting all said mastic material to harden.

ROBERT M. ECKERMAN.
CHARLES E. FISHER.